US005351382A

United States Patent [19]

Merrick

[11] Patent Number: 5,351,382

[45] Date of Patent: Oct. 4, 1994

[54] METHOD OF UNSCREWING A THREADED MEMBER

[75] Inventor: Jake Merrick, Lubbock, Tex.

[73] Assignee: Jeranddo, Inc., Stuart, Fla.

[21] Appl. No.: 109,680

[22] Filed: Aug. 20, 1993

Related U.S. Application Data

[63] Continuation of Ser. No. 13,247, Feb. 3, 1993, Pat. No. 5,251,515, which is a continuation of Ser. No. 937,497, Aug. 28, 1992, abandoned, which is a continuation of Ser. No. 772,578, Oct. 7, 1991, Pat. No. 5,152,195.

[51] Int. Cl.[5] .............................................. B23P 19/00

[52] U.S. Cl. .................................. 29/426.5; 29/426.1

[58] Field of Search .................... 29/426.1, 426.5, 456; 81/53.2, 90.2, 128, 121.1; 279/66, 71, 110

[56] References Cited

U.S. PATENT DOCUMENTS

| | | | |
|---|---|---|---|
| 2,582,444 | 1/1952 | Lucht | 81/128 |
| 2,701,724 | 2/1955 | Harris | 279/71 |
| 4,724,730 | 2/1988 | Mader et al. | 81/53.2 |
| 4,856,386 | 8/1989 | Rodriguez | 81/90.2 |
| 4,932,292 | 6/1990 | Merrick | 81/57.18 |
| 5,090,273 | 2/1992 | Fossella | 81/57.13 |
| 5,148,727 | 9/1992 | Williamson | 81/121.1 |
| 5,207,129 | 5/1993 | Fossella | 81/128 X |
| 5,235,878 | 8/1993 | Young | 81/53.2 |

FOREIGN PATENT DOCUMENTS

| | | | |
|---|---|---|---|
| 71053 | 10/1959 | France | 81/121.1 |
| 22746 | of 1898 | United Kingdom | 81/121.1 |

*Primary Examiner*—Mark Rosenbaum
*Assistant Examiner*—S. Thomas Hughes
*Attorney, Agent, or Firm*—James E. Bradley

[57] ABSTRACT

A device for gripping a stud to unscrew the stud includes a tubular housing. The housing has an axial bore with a plurality of cam surfaces formed in the bore. A cage is carried in the bore. The cage has a number of windows, each located adjacent one of the cam surfaces. A jaw is carried in each window of the cage. Each jaw has an outer side that mates with one of the cam surfaces and an inner side containing teeth for gripping the stud. The cam surfaces will move each jaw radially between inner and outer position when the housing rotates relative to the cage. A spring urges the jaws to the outer position.

4 Claims, 2 Drawing Sheets

METHOD OF UNSCREWING A THREADED MEMBER

This application is a continuation of application Ser. No. 08/013,247 filed on Feb. 3, 1993, U.S. Pat. No. 5,251,515, issued Oct. 12, 1993, which was a continuation of Ser. No. 07/937,497 filed on Aug. 28, 1992, now abandoned, which was a continuation of Ser. No. 07/772,578 filed on Oct. 7, 1991, U.S. Pat. No. 5,152,195, issued Oct. 6, 1992.

BACKGROUND OF THE INVENTION

1. Field of the invention

This invention relates in general to devices for unscrewing threaded members, and in particular to a socket member that will slide over a threaded rod or stud to engage and loosen the stud.

2. Description of the Prior Art

In industry, there are numerous applications in which threaded rods or studs must be broken out. Often these studs will have encountered extreme conditions of temperature and weather, causing rust. Also, the studs may have been initially installed under considerable torque. As a result, breaking out the studs is often a difficult task.

In U.S. Pat. No. 4,932,292, Jun. 12, 1990, a device is shown that is particularly used for breaking out sucker rods for beam type pumps. That device uses jaws which slide on cam surfaces between inner and outer positions.

SUMMARY OF THE INVENTION

In this invention, the apparatus has a housing with a bore. Cam surfaces are formed in the bore. A cage is carried in the bore, the cage having windows. A jaw is carried in each window of the cage. A spring urges each jaw outward. The cam surface will push each jaw inward when the housing rotates relative to the cage.

DETAILED DESCRIPTION OF THE INVENTION

Figure 1:
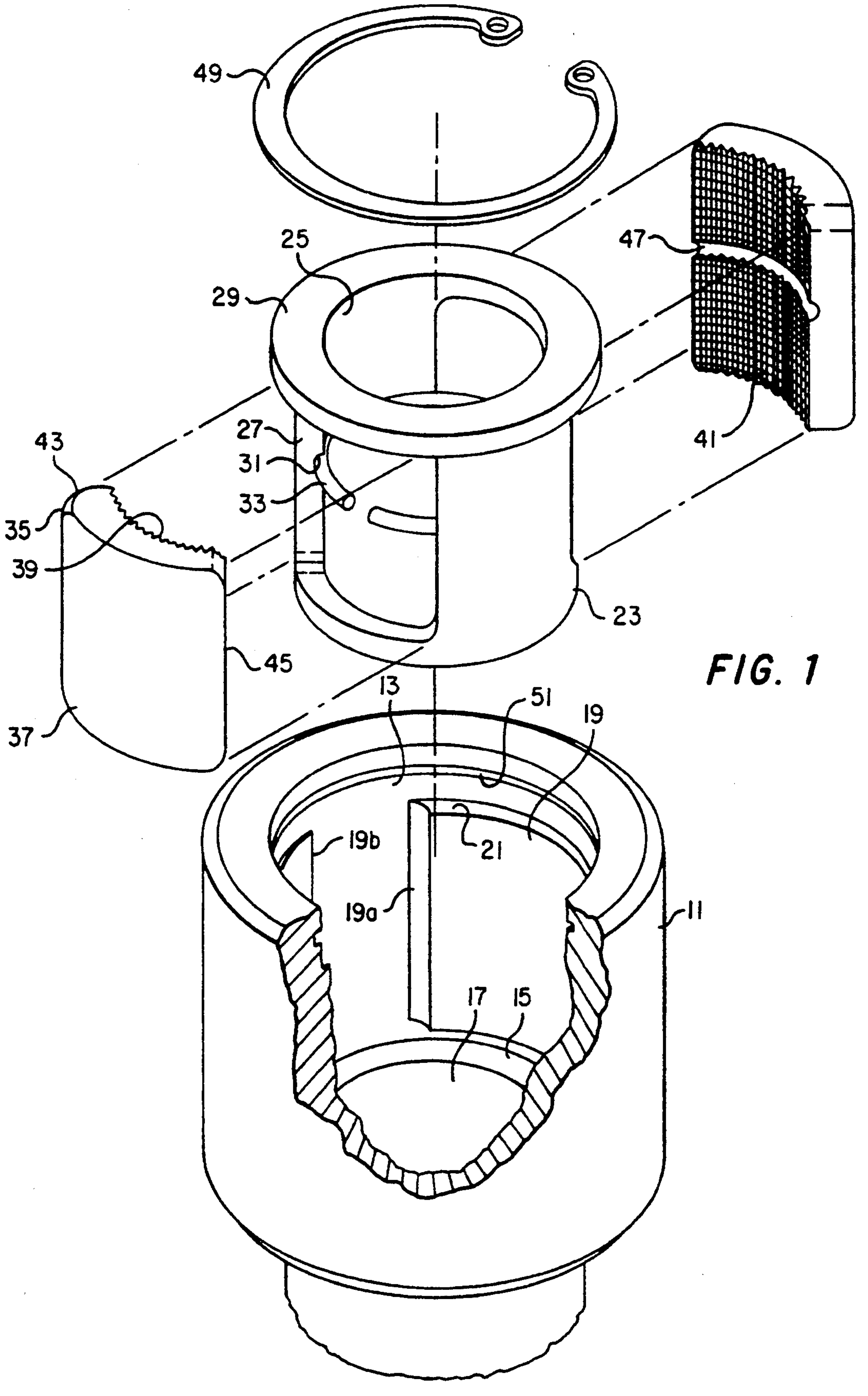
FIG. 1 is a partial exploded perspective view of an apparatus constructed in accordance with this invention.

Referring to FIG. 1, the apparatus in this invention includes a housing 11. Housing 11 is a tubular cylindrical member having an axial bore 13. A lower shoulder 15 is formed in bore 13. Bore 13 has a lower portion 17 that extends below the lower shoulder 15. The lower portion 17 may extend two feet or more. The lower portion 17 is of lesser diameter than the portion of the bore 13 above lower shoulder 15. A polygonal recess or socket (not shown) is located at the lower end of the housing 11 for receiving the rotary drive shank of an air impact tool.

Figure 2:
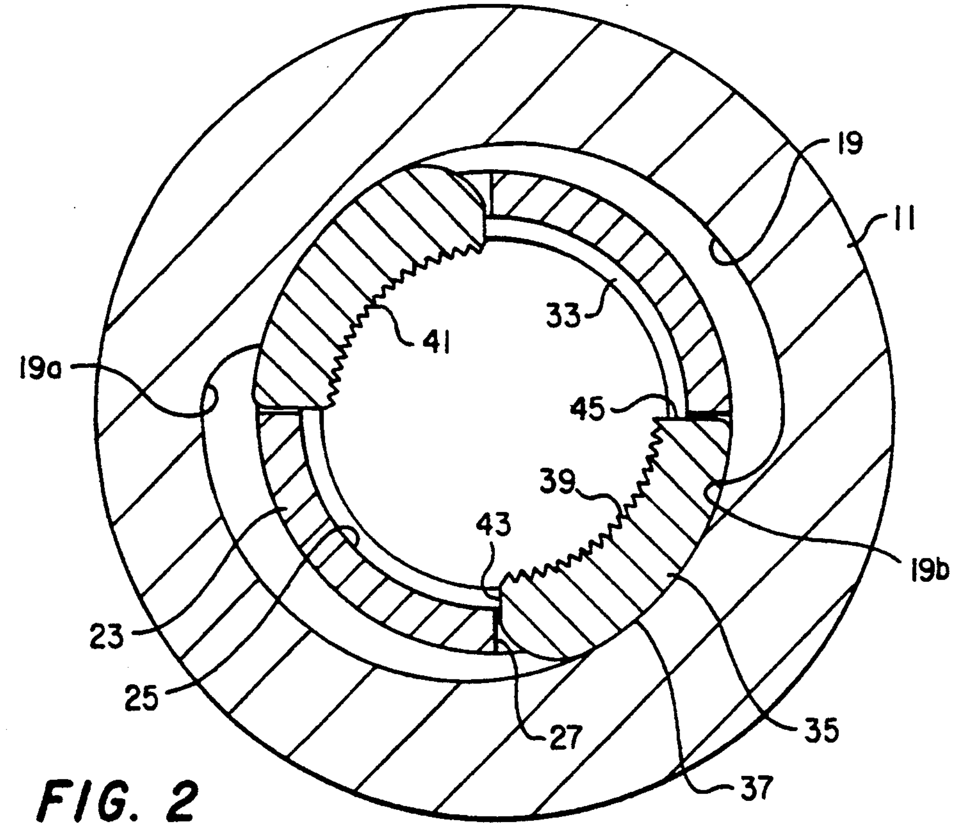
FIG. 2 is a sectional view of the apparatus of FIG. 1, shown assembled, and showing the jaws in an inner position.
Figure 3:
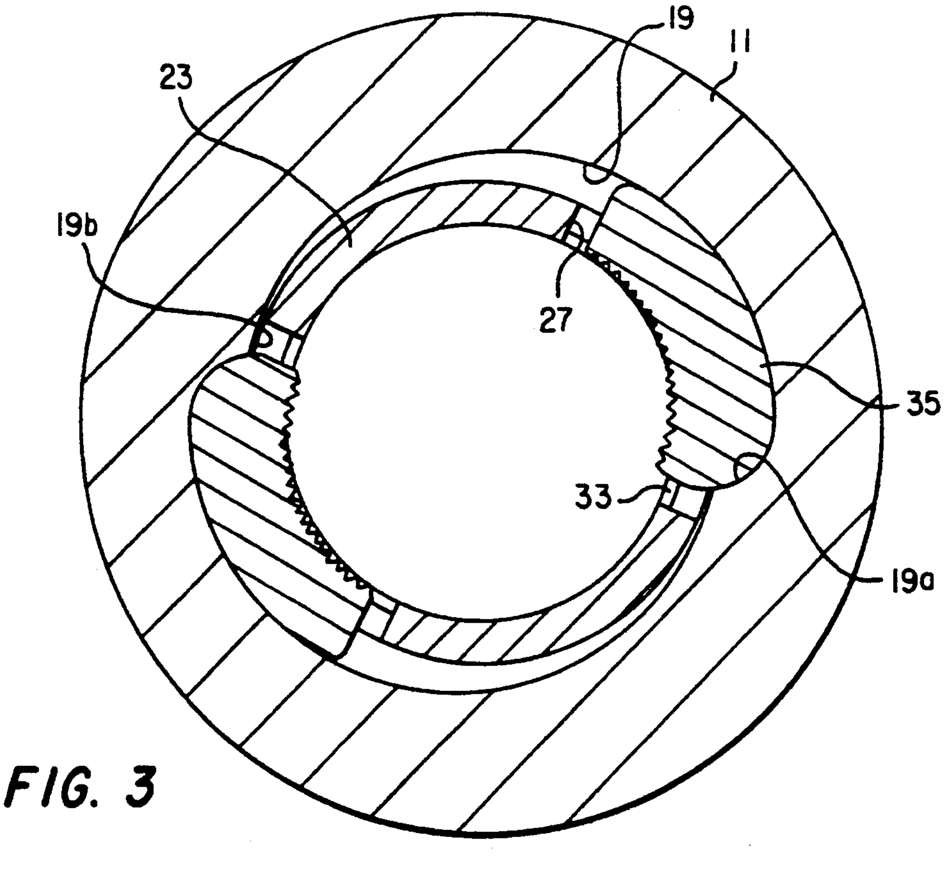
FIG. 3 is a sectional view of the apparatus of FIG. 1, as shown in FIG. 2, but showing the jaws in an outer position.

As shown also in FIGS. 2 and 3, two cam surfaces 19 are formed in bore 13 above lower shoulder 15. Each cam surface 19 is a smooth curved surface that moves gradually inward in a radial direction toward the axis of bore 13. The farthest distance from cam surface 19 to the axis is at the outer end **19*a*, while the closest distance is at the inner end 19*b*. Each cam surface 19 is located above lower shoulder 15. Each cam surface 19 has an upper edge 21 that is perpendicular to the axis of housing 11 and located below the upper end of housing 11. Upper edges 21** are located in a common plane, defining a shoulder.

Referring particularly to FIG. 1, a cage 23 locates in bore 13. Cage 23 is a cylindrical sleeve member. The exterior of cage 23 is cylindrical, as well as its inner diameter 25. Two windows 27 are formed in cage 23. Windows 27 are generally rectangular in configuration, having upper and lower edges that are parallel to each other and perpendicular to side edges. Cage 23 has an outward protruding flange 29 located on its upper end. Flange 29 locates on the upper edges 21 of the cam surfaces 19. Flange 29 supports cage 23 in housing 11. Housing 11 is capable of limited rotation relative to cage 23.

A groove 31 is formed in the inner diameter 25 of cage 23. Groove 31 extends circumferentially around inner diameter 25 perpendicular to the longitudinal axis of cage 23. A wire spring 33 snaps into groove 31. Spring 33 is a resilient circular wire that split so that it can contract and expand. It is in a contracted position while in groove 31, exerting a radial outward force against groove 31.

A jaw 35 is carried in each window 27. Each 35 has a generally rectangular configuration for closely being received in each window 27. Each jaw 35 has a smooth outer side 37 that is curved for mating with one of the cam surfaces 19. Each jaw has a curved inner side 39 that is located on a single radius. Teeth 41 are formed on the inner side 39.

Each jaw 35 has a thicker edge 43 that tapers gradually to a thinner edge 45, as illustrated in FIG. 2. The difference in thickness of jaws 35 is selected so as to accommodate the contour of the cam surfaces 19. When the jaws 35 move inward to an inner position, the inner sides 39 will be located on a radius of the axis, as can be seen by comparing FIG. 3 with FIG. 2. As a result, the teeth 41 will engage a cylindrical threaded rod or stud (not shown) evenly across the width of jaw 35.

Referring again to FIG. 1, each jaw 35 has a groove 47 formed on its inner side 39. Groove 47 is a circumferentially extending groove located about midway along the length of each jaw 35. Groove 47 will register with the groove 31 and the spring 33. The spring 33 will locate in the groove 47 to urge the jaws 35 outward from cage 23.

Referring still to FIG. 1, cage 23 is refrained in the housing 11 by a retainer or snap ring 49. Retainer ring 49 snaps into a groove 51 spaced above the cam surface upper edges 21. The cage flange 29 will be sandwiched between the cam surface upper edges 21 and the retainer ring 49.

In operation, the device will appear as shown in FIG. 3. The spring 33 (FIG. 1) will exert a force on the jaws 35 that pushes them outward. The outward force will have caused cage 23 to rotate relative to housing 11 a limited amount until the jaws 35 are located in the outer positions in contact with outer ends **19*a*. Spring 33 will be located in grooves 31, A portion of the teeth 41 will be substantially flush with the inner diameter 25 of the cage 23**.

The user will insert the housing 11 over the stud to be unscrewed. If the stud is of a type having threads on its upper end and a cylindrical shank below, the user will insert the housing 11 until the cylindrical shank portion of the stud locates in the area of the jaws 35. The threaded portion will extend into the extended or lower bore portion 17. The user will connect a rotary power tool, such as an air impact wrench to the lower end of the housing 11. The user will do this by inserting the drive head of the impact tool into the polygonal recess (not shown) in the lower end of housing 11.

The user then will spin the housing 11 by energizing the power tool. The spinning will be at fairly high speed. Inertia of the cage 23 and jaws 35 will cause the housing 11 to rotate a limited amount relative to the cage 23. During this rotation, the cage 23 will slip relative to housing 11.

This results in the jaws 35 sliding on the cam surfaces 19 from the outer position shown in FIG. 3 toward the inner position shown in FIG. 2. In the inner position, the spring 33 will still engage the grooves 47 in the jaws 35, but may be spaced inward of the groove 31 in the cage 23. Even in the inner position, the jaws 35 will still be partially located in the windows 27. The teeth 41 will engage the stud, causing the stud to rotate with the housing 11. This unscrews the stud.

The invention has significant advantages. The jaws are carried in a cage member. The cage maintains jaw positions in a less complex manner than prior art gripping devices utilizing cam actuated jaws.

While the invention has been shown in only one of its forms, it should be apparent to those skilled in the art that it is not so limited, but is susceptible to various changes without departing from the scope of the invention.

I claim:

1. A method of unscrewing a threaded member, comprising:

providing a housing having a bore with an open upper region and an extended lower region which joins the upper region, the lower region being of a smaller diameter than the upper region, with the upper region containing both a plurality of formed cam surfaces and carrying a plurality of non-pivoting jaws;

positioning a cylindrical portion of the threaded member within the confines of the jaws, wherein an end of the threaded member extends beyond the jaws and into the lower region;

coupling a rotary power source to a lower end of the housing at a lower end of the lower region of the bore;

spinning the housing with the rotary power source, causing the jaws to engage the cylindrical portion of the threaded member by a radial movement produced by rotation of the housing relative to the jaws and by the sliding of the jaws along the cam surfaces; and unscrewing the threaded member by continued spinning of the housing after the jaws have engaged the threaded member.

2. The method according to claim 1 wherein the jaws are resiliently held in an open position prior to the rotation and subsequent engagement of the jaws with the threaded member.

3. A method of unscrewing a threaded member, comprising:

providing a housing having a bore with an open upper region and a narrowed, extended lower region which joins the upper region and is of lesser diameter than the upper region, with the upper region containing both a plurality of formed cam surfaces and a cylindrical insert having a plurality of non-pivoting jaws, each jaw resiliently carried by the insert;

positioning a cylindrical portion of the threaded member within the confines of the insert, wherein an end of the threaded member extends beyond the insert and into the lower region;

connecting a rotary power source to a lower end of the housing at a lower end of the lower region of the bore;

spinning the housing with the rotary power source;

gripping the cylindrical portion of the threaded member with the jaws, initiated by the rotary motion of the housing relative to the insert and by the jaws moving along the cam surfaces relative to the rotating housing; and unscrewing the threaded member by continued spinning of the housing after the jaws have engaged the threaded member.

4. A method of unscrewing a threaded member, comprising:

providing a housing having an axial bore with an axis and an open-ended, upper portion and an extended, narrower lower portion which has a diameter that is less than the upper portion of the bore, the housing having a lower end at a lower end of the lower portion which is adapted to be connected to a rotary power source for rotation therewith, the upper portion of the bore having a plurality of cam surfaces formed in the bore, each cam surface extending circumferentially a selected distance and decreasing in distance to the axis from an outer end to an inner end;

positioning a cylindrical insert in the bore of the upper portion, the insert carrying a plurality of non-pivoting jaws, each jaw located adjacent one of the cam surfaces and resiliently held in such position by the insert and being radially movable relative to the insert, each jaw having an outer side that mates with one of the cam surfaces and an inner side adapted to grip the threaded member;

positioning a cylindrical portion of the threaded member within the confines of the insert and extending an end portion of the threaded member through the insert into the lower portion of the bore;

spinning the housing with the rotary power source:

gripping the cylindrical portion of the threaded member with the jaws, initiated by the rotary motion of the housing relative to the insert and by the jaws moving along the cam surfaces and radially inward relative to the insert; and unscrewing the threaded member by continued spinning of the housing after the jaws have engaged the threaded member.

* * * * *